(12) United States Patent
Biris et al.

(10) Patent No.: US 11,611,290 B2
(45) Date of Patent: Mar. 21, 2023

(54) WIND TURBINE WITH REDUCED DC-VOLTAGE RESERVE

(71) Applicant: VESTAS WIND SYSTEMS A/S, Aarhus N (DK)

(72) Inventors: Ciprian Biris, Hinnerup (DK); Kent Tange, Ry (DK); Duy Duc Doan, Tilst (DK); Torsten Lund, Fredericia (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 333 days.

(21) Appl. No.: 16/957,085

(22) PCT Filed: Dec. 6, 2018

(86) PCT No.: PCT/DK2018/050329
§ 371 (c)(1),
(2) Date: Jun. 22, 2020

(87) PCT Pub. No.: WO2019/120406
PCT Pub. Date: Jun. 27, 2019

(65) Prior Publication Data
US 2020/0350834 A1 Nov. 5, 2020

(30) Foreign Application Priority Data
Dec. 22, 2017 (DK) .......................... PA 2017 71013

(51) Int. Cl.
*H02M 7/5395* (2006.01)
*H02M 5/458* (2006.01)
*H02P 27/08* (2006.01)

(52) U.S. Cl.
CPC ....... *H02M 7/5395* (2013.01); *H02M 5/4585* (2013.01); *H02P 27/085* (2013.01)

(58) Field of Classification Search
CPC .. H02M 5/4585; H02M 7/5395; H02P 27/085
See application file for complete search history.

(56) References Cited

U.S. PATENT DOCUMENTS

2003/0048651 A1   3/2003   Trimble et al.
2005/0258795 A1   11/2005  Choi
(Continued)

FOREIGN PATENT DOCUMENTS

CN   105375523 A   3/2016
EP   2546969 A1    1/2013
(Continued)

OTHER PUBLICATIONS

PCT Notification of Transmittal of the International Search Report and the Written Opinion of the International Searching Authority, or the Declaration, Application: PCT/DK2018/050329, dated Mar. 8, 2019.
(Continued)

*Primary Examiner* — Jue Zhang
(74) *Attorney, Agent, or Firm* — Patterson + Sheridan, LLP (57) ABSTRACT

The invention relates to a method for operating a wind turbine which comprises a power generator, a generator side converter, a grid side converter, a DC link electrically connected to an output of the generator side converter and an input of the grid side converter. The method comprises monitoring a wind turbine signal for detection of an operational condition which requires an increase of an output voltage of the grid side converter, upon detection of the operational condition, initiate an over-modulation mode wherein the grid side converter is operated with a modulation index in an over-modulation range, and upon the detection of the operational condition, initiate a DC-voltage adjustment mode wherein the a DC-voltage of the DC link
(Continued)

is increased from a first voltage level towards a second voltage level.

17 Claims, 5 Drawing Sheets

(56) References Cited

U.S. PATENT DOCUMENTS

| | | |
|---|---|---|
| 2011/0140438 A1 | 6/2011 | Delmerico et al. |
| 2013/0265809 A1 | 10/2013 | Gupta et al. |
| 2015/0333677 A1* | 11/2015 | Letas .................. H02M 1/32 290/44 |
| 2017/0298904 A1 | 10/2017 | Nielsen |

FOREIGN PATENT DOCUMENTS

| | | |
|---|---|---|
| EP | 2655871 A1 | 10/2013 |
| JP | H11215808 A | 8/1999 |
| JP | 2007166815 A | 6/2007 |
| JP | 2011009085 A | 1/2011 |
| WO | 2011160643 A2 | 12/2011 |
| WO | 2019120406 A1 | 6/2019 |

OTHER PUBLICATIONS

PCT Written Opinion of the International Searching Authority, Application: PCT/DK2018/050329, dated: Mar. 8, 2019.
Danish Patent and Trademark Office, 1st Technical Examination of Application PA 2017 71013. dated Jun. 19, 2018.

\* cited by examiner

WIND TURBINE WITH REDUCED DC-VOLTAGE RESERVE

FIELD OF THE INVENTION

The invention relates to wind turbines, particularly to control of power converters of wind turbines.

BACKGROUND OF THE INVENTION

Use of high DC-link voltages of power converters can reduce the lifetime of the IGBT transistors due to the impact of cosmic rays. Accordingly, it is desired to keep the DC-link voltage as low as possible. However, in certain situations such as situations where the grid voltage increase above nominal grid voltage, the output voltage amplitude of the power generated by the grid side converter may need to be increased, e.g. in order to prevent a high current flowing from the grid into the grid side converter. There are other situations which also require an increase of the voltage amplitude at the grid side power converter.

EP2655871 A1 discloses a method of operating a wind turbine. The wind turbine comprises a power generator, a generator side converter connected to the power generator, a line side converter connected to a power grid through power components, and a DC-link connected between the generator side converter and the line side converter is provided. The method comprises monitoring the grid voltages on the power grid for overvoltage events and if an overvoltage event is detected, the line side converter is operated in an over-modulation range for at least a part of the duration of the overvoltage event.

Thus, EP2655871 A1 provides a solution to the above-mentioned problem by using over-modulation to increase the output voltage in case of overvoltage situations. However, over-modulation causes grid pollution due generation of harmonics which are injected into the grid.

Accordingly, there is still a need for improving wind turbines in cases where an increase of the generated output voltage is desired.

SUMMARY OF THE INVENTION

It is an object of the invention to improve wind turbines with respect to generation of increased output voltages in situations where this is required or advantageous. It is also an object of the invention to improve the situation where generation of high output voltage causes grid pollution due to use of over-modulation. It is also an object of the invention to improve the situation where the lifetime of switching elements of the power converter is reduced due to high DC-link voltages.

In a first aspect of the invention there is provided a method for operating a wind turbine which comprises a power generator, a generator side converter, a grid side converter, a DC link electrically connected to an output of the generator side converter and an input of the grid side converter, the method comprises monitoring a wind turbine signal for detection of an operational condition which requires an increase of an output voltage of the grid side converter, upon detection of the operational condition, initiate an over-modulation mode wherein the grid side converter is operated with a modulation index in an over-modulation range, upon the detection of the operational condition, initiate a DC-voltage adjustment mode wherein a DC-voltage of the DC link is increased from a first voltage level towards a second voltage level.

The first voltage level may have a voltage within a range from 3 to 10 percent above a minimum DC-voltage. The minimum DC-voltage is a minimum voltage required for generation of an output voltage Uo at nominal level, i.e. an output voltage Uo required for matching a nominal grid voltage Ug. The first voltage level represent a DC-link voltage reserve which relaxes control requirements and provides room for dynamics in the control of the grid side converter, e.g. due to variations in the rotor speed.

It is an advantage to keep the DC-voltage at a minimum in view of lifetime preservation due to the impact of cosmic rays. On the other hand, setting the DC-voltage reserve low, sets harder requirements for the control of the grid side converter and therefore limits the room for dynamics of the system.

Advantageously, by initiating an over-modulation mode as soon as an operational condition is detected, i.e. an operational condition which is created due to a dynamic situation such as an increase generator speed, the requirement of a fast increase of the output voltage of the grid side converter can be met by the increase of the modulation index. Thus, the first voltage level may be set to a lower value as compared to solutions which does not implement the over-modulation function.

As mentioned, over-modulation also has disadvantages and, therefore, the duration of applying the over-modulation mode may be limited, e.g. by use of a timer. For example, the over-modulation mode may be limited to periods up to 10 ms, 20 ms, 50 ms, 100 ms possibly up to 500 ms or 1 s.

Since the DC-voltage adjustment mode is also initiated in response to the detection of the operational condition, the increased DC-voltage can satisfy the requirement for an increased output voltage when the DC-link capacitor has been charged. Thus, the grid side converter can be brought out of over-modulation when the DC-link capacitor has been charged up to the second voltage level during the above-mentioned period, e.g. a 20 ms period.

An objective of the technical solution according to the first aspect is to handle dynamic situations which require an increased output voltage by use a reduced DC-link reserve. Particularly, an objective is to handle dynamic situations which can be handle by a relatively low increase of the DC-link voltage reserve. Thus, the second voltage level may represent a relatively low increase of the DC-voltage. For example, the first voltage level may have a voltage within a range from 8 to 20 percent above a minimum DC-voltage. Thus, even though the DC-link voltage is increased, the impact on the lifetime due to cosmic rays may not significant, particularly for operational conditions having a relatively low duration, e.g. below 1-10 s.

According to an embodiment, at least a sub-period of the over-modulation mode and a sub-period of the DC-voltage adjustment mode take place concurrently. Advantageously, at least a sub-period of the adjustments of the modulation index and the DC voltage takes place concurrently so that one adjustment can compensate the other.

According to an embodiment, the modulation index is decreased at least during a sub-period of the over-modulation mode, and the DC-voltage is increased at least during a sub-period of the DC-voltage adjustment mode. The decrease of the modulation index takes place after an initial increase of the modulation index, e.g. a step-increase at the time when the operational condition is detected. The changes of the modulation index and the DC-voltage may be linear or nor-linear adjustments as a function of time.

According to an embodiment, a rate of change of the decrease of the modulation index (during at least a sub-period of the over-modulation mode) and a rate of change of the increase of the DC-voltage (during at least a sub-period of the DC-voltage adjustment mode) are matched in order to achieve a desired output voltage of the grid side converter, e.g. in order to achieve a constant or substantially constant output voltage.

According to an embodiment, the modulation index is changed dependent on a level of the DC-voltage between the first and second voltage levels. For example, the modulation index may be adaptively adjusted dependent on the charging level, i.e. DC-voltage, of the DC-link capacitor.

According to an embodiment, the over-modulation mode may be changed back to a linear modulation mode dependent on the DC-voltage between the first and second voltage levels. For example, when the DC-voltage has reached the second voltage level, a change back to the linear modulation mode may be invoked.

According to an embodiment, the grid side converter is operated with a modulation index in an over-modulation range for a predetermined or variable period of time, where the predetermined or variable period of time is dependent on the detected operational condition. For example, a predetermined or maximum limit of a variable period of time may be set, e.g. dependent on a type of the operational condition or a level of a grid over-voltage.

According to an embodiment, accumulated DC-voltage data is obtained based on the DC-voltage and time data, so that the accumulated DC-voltage data relates to an accumulated time where the DC-voltage is above a predetermined voltage level. Advantageously, the accumulated DC-voltage data can be used to indicate the remaining lifetime of switching components, e.g. IGBTs, of the power converters.

According to an embodiment, the second voltage level and/or a maximum duration of applying the increased DC-voltage is based on the accumulated DC-voltage data. Advantageously, this allows adjustments of the DC-voltage or duration of applying an increased DC-voltage dependent on the remaining lifetime.

According to an embodiment, the method comprises, after the DC-voltage has reached the second voltage level, decreasing the DC-voltage and increasing the modulation index.

According to an embodiment, increasing the modulation index takes place after the over-modulation mode has been changed back to a linear modulation mode and the DC-voltage has reached the second voltage level. Advantageously, the additional increase of the modulation index enables handling of operational conditions of longer durations.

According to an embodiment, a rate of change of the decrease of the DC-voltage and a rate of change of the increase of the modulation index are matched in order to achieve a desired output voltage of the grid side converter.

According to an embodiment, at least a part of a period of decreasing the DC-voltage and at least a part of a period of increasing the modulation index takes place concurrently.

For example, the detected operational condition can be one of an over-voltage situation where the grid voltage is above a nominal voltage level, a recovery from an under-voltage situation where the grid voltages increases from a low voltage to the nominal voltage level, a generator condition where an increased output voltage of the grid side converter is required due a required increase of the generator speed, or a generator condition where over-modulation is temporarily required in situations where the modulation index is close to the over-modulation range.

A second aspect of the invention relates to a control system for operating a wind turbine, the wind turbine comprises a power generator, a generator side converter, a grid side converter, a DC link electrically connected to an output of the generator side converter and an input of the grid side converter, the control system is arranged to monitor a wind turbine signal for detection of a certain operational condition which requires an increase of an output voltage of the grid side converter, and upon detection of the operational condition, to initiate an over-modulation mode wherein the grid side converter is operated with a modulation index in an over-modulation range, and upon the detection of the operational condition, to initiate a DC-voltage adjustment mode wherein the a DC-voltage of the DC link is increased from a first voltage level towards a second voltage level.

A third aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
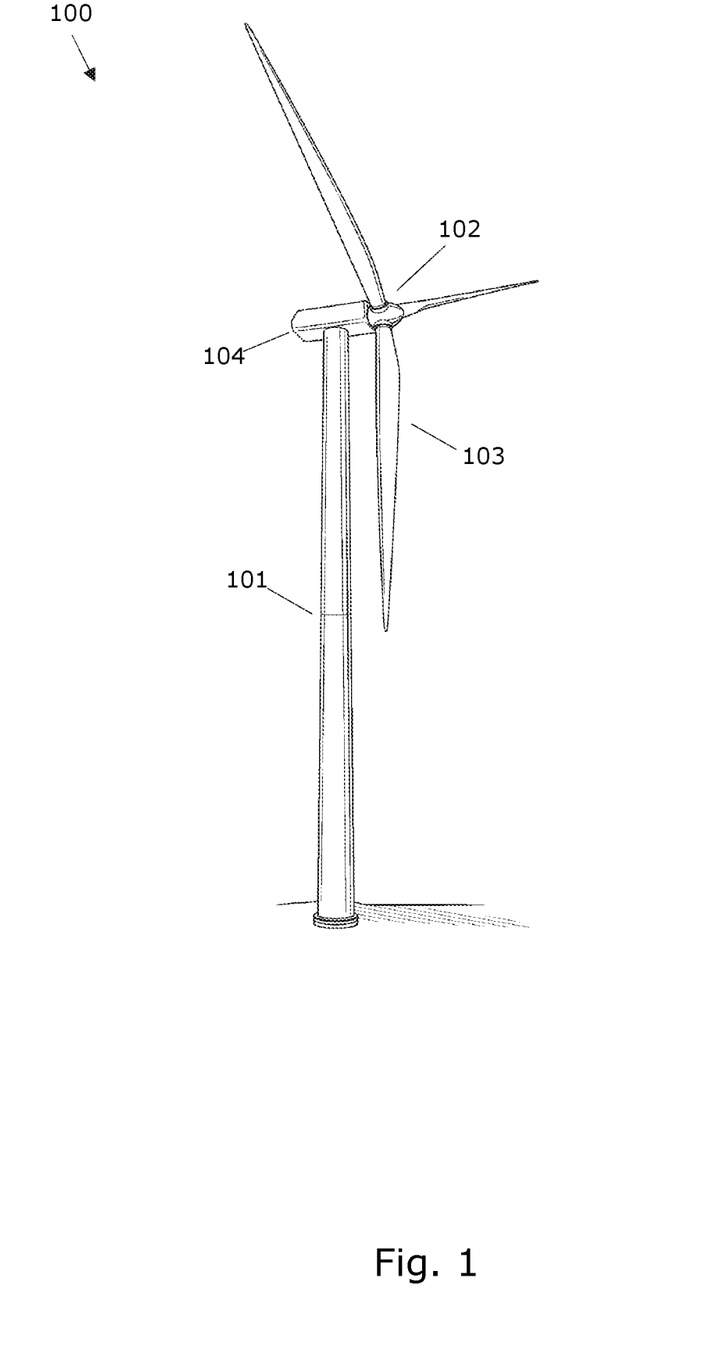
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a grid side converter. The generator side converter converts the generator AC power into DC power and the grid side converter converts the DC power into an AC power for injection into the utility grid via output inductors of the wind turbine 100.

Figure 2:
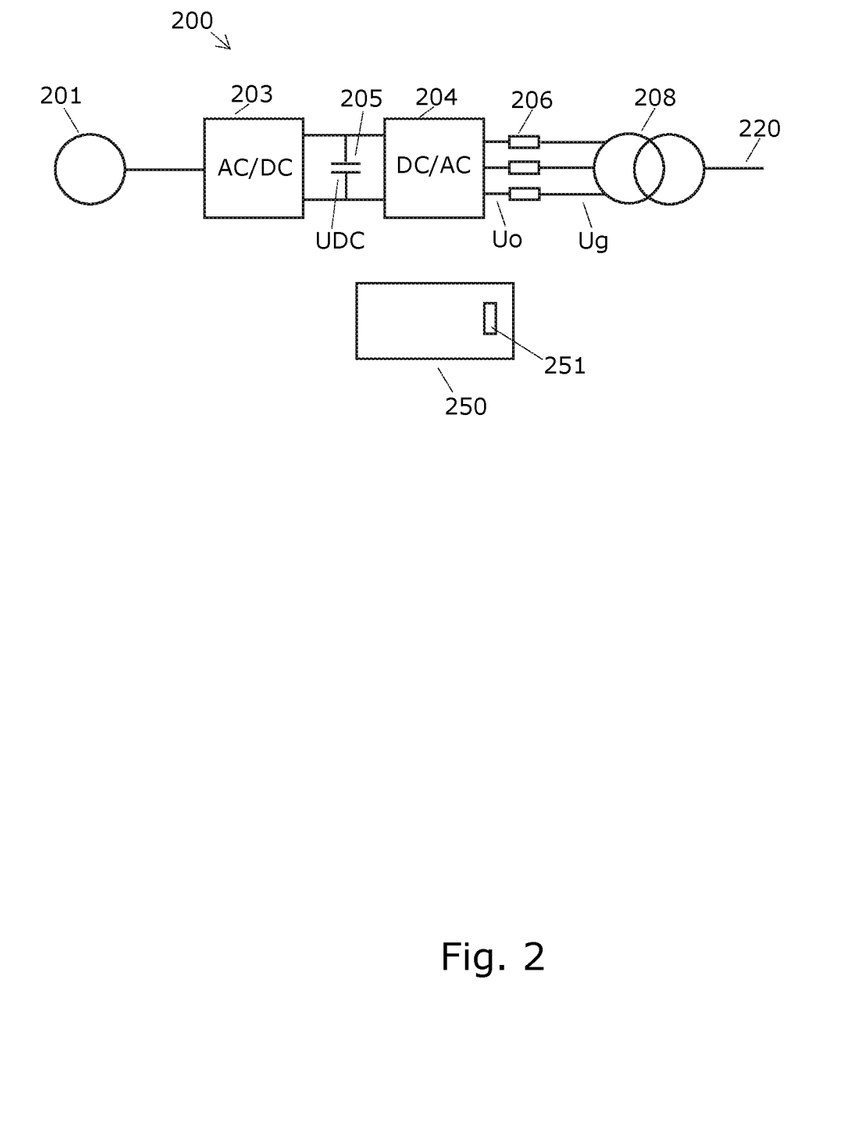
FIG. 2 shows a power generating system of a wind turbine.

FIG. 2 shows an example of a power system 200 of a wind turbine 100. The power system comprises a generator 201, a generator side converter 203, a grid side converter 204 and a DC-link 205. The DC-link 205 comprises on or more DC-link capacitors which are charged by the DC output current from the generator side converter 203 and which supplies DC power to the grid side converter 204. The output AC current from the grid side converter 204 is supplied via output inductors 206 and possibly via a grid transformer 208 to the grid 220.

The grid side converter is able to withstand a certain grid overvoltage Ug, e.g. 1.1-1.3 pu. To some degree, the grid over-voltages may be handled by absorbing reactive power so that a voltage drop is generated over the output inductors 206. Absorption of reactive power may lead to charging of the DC-link capacitors. Charging of the DC-link capacitor may lead to unintended tripping of the converter system/wind turbine and/or damage of power components.

Alternatively, such overvoltage situations may be handled by increasing the output voltage Uo of the grid side converter 204, i.e. the voltage amplitude at the electrical connection between the output of the grid side converter 204 and the output inductors 206.

Overvoltage situations may be due to a temporarily increase of the grid voltage due to some grid problem which cause an increase of the grid voltage above the nominal grid voltage. Such overvoltage situations may be referred to as overvoltage ride through situations (OVRT). Another situation which may be handled by an increase of an output voltage of the grid side converter is a recovery from an under-voltage situation where the grid voltage increases from a low voltage to the nominal voltage level. The grid voltage recovery situation requires a temporarily increased output voltage Uo dynamics of the control system, particularly due to a delay between the increase of the grid voltage Ug during the recovery and a feedforward value of the grid voltage Ug which is added to the controller 503 (see FIG. 5, but feedforward is not shown) and forms part of the output Uq. Similarly, a generator condition which requires or causes an increase of the generator speed may require an increased output voltage of the grid side converter. As another example, in situations where the modulation index of the PWM-modulation is close to the over-modulation range (see explanation below), a conditions may arise where over-modulation is temporarily required in order to increase the output voltage.

FIG. 2 also shows a control system 250 for operating the wind turbine, particularly for controlling the grid side converter 204. The grid side converter 204 uses some variant of pulse width modulation (PWM) for converting the DC power into AC power. The control system 250 is used for controlling the modulation of the grid side converter 204. Particularly, the grid side converter 204 may be controlled in a linear modulation mode and an over modulation mode. Furthermore, the control system 250 is used for controlling the DC-voltage of the DC link 250. An example, of the voltage control is explained in connection with FIG. 5.

The output voltage Uo of the grid side converter is dependent on the DC-voltage UDC and the modulation factor. Thus, the DC-voltage sets a limit on the maximum output voltage Uo. In the linear modulation mode the grid side converter is operated with a modulation index within a linear modulation range. In the linear modulation range the output voltage Uo increases linearly with the modulation factor up to a maximum linear modulation factor. By increasing the modulation factor further beyond the maximum linear modulation factor into an over-modulation range, the output voltage Uo can be increased beyond the maximum voltage amplitude which can be achieved in the linear modulation mode, but at the cost of lower order harmonics in the output voltage Uo. The lower order harmonics leads to grid pollution. Accordingly, use of over-modulation may not be acceptable, e.g. according to grid codes. However, use of over-modulation may be acceptable for shorter periods. The maximum voltage amplitude is achieved when the output voltage signal Uo has the form of a square-wave. In this case the grid side converter 204 is operated in six-step operation or with a maximum over-modulation.

Another way to increase the output voltage amplitude Uo is to increase the DC-voltage UDC of the DC link 205. A problem with increasing the DC link voltage is that the risk for a breakdown of the switching elements, e.g. IGBTs, due to cosmic rays increases with the DC link voltage. The DC link voltage may be increased, but at the cost of reduced life-time of the switching elements.

Figure 3A:
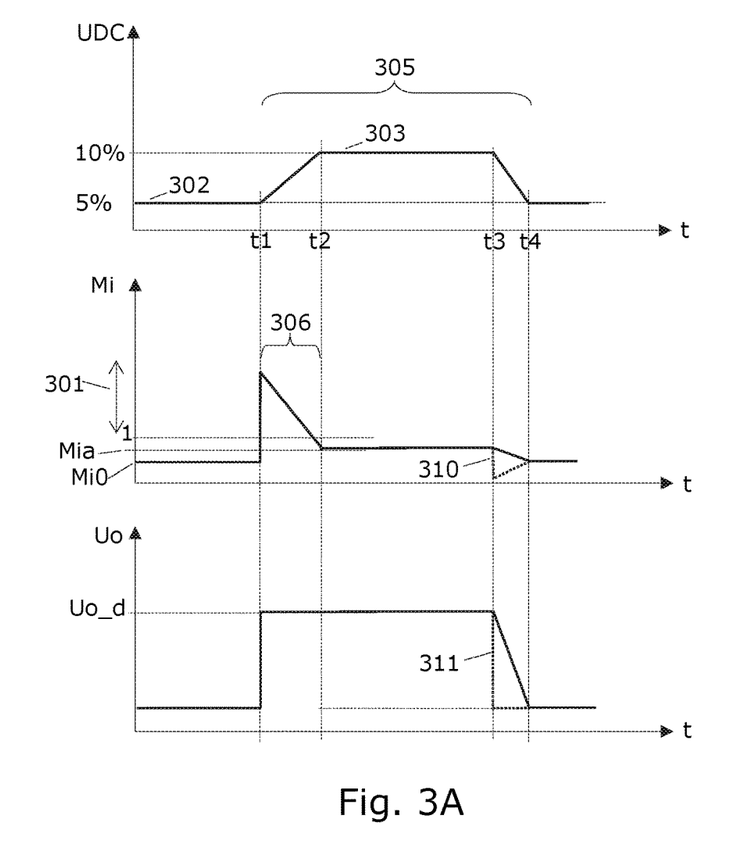
FIG. 3A shows a method for operating the wind turbine in response to a detected operational condition which requires an increase of the grid converter's output voltage.

FIG. 3A illustrates method for operating the wind turbine 100 in response to a detected operational condition which requires an increase of an output voltage Uo of the grid side converter 204.

The operational condition—e.g. a high generator speed—may be detected by a monitoring function 251 of the control system 250. The monitoring function may be configured to measure or estimate the grid voltage Ug, the generator speed or other operational variable or parameter of the wind turbine 100. In general, the monitoring function monitors a wind turbine signal and on basis of the signal, a measured or estimated signal or value is obtained from which the presence of a specific operational condition can be determined.

The operational condition is detected at t1 and triggers the start of an over-modulation mode wherein the grid side converter is operated with a modulation index Mi in an over-modulation range 301 for a predetermined or variable period of time—in this example between t1 and t2. In this example, the maximum modulation index Mi in the linear range has the value "one" and over-modulation indices has values above "one". However, the boundary between linear modulation and over-modulation can have other values dependent on how the modulation index is defined.

Due to the increase of the modulation index Mi, the output voltage Uo increases to the desired voltage Uo_d.

In this example, the reference voltage of the DC-link during normal operation is set to a value which is 5% above a minimum value Umin. The 5% margin provides a DC-voltage reserve which can be used to adjust the output voltage Uo, e.g. by increases of the modulation index Mi in the linear modulation range. Furthermore, the voltage reserve provides room for dynamics of the control of the grid side converter 204. The voltage level of the voltage reserve is controlled by the control system 250.

In this example, at the same time when the over-modulation mode is initiated, i.e. at time t1, the control system 250 initiates a DC-voltage control mode 305—here between t1 and t4—where the DC-link voltage UDC is controlled. The control of the DC-voltage includes an initial increase of the DC-link voltage from a first voltage level 302 (here 5% above nominal) towards a second voltage level 303 (here 10% above nominal). In order to compensate the effect of the increase of the DC-link voltage on the output voltage Uo, the modulation index Mi may be decreased during t1-t2. The modulation index Mi may be decreased to value Mia which together with the second voltage level 303 generates the desired output voltage Uo_d. The modulation index Mia may be above or preferably below the over-modulation threshold value 1. As a result the output voltage Uo is constant during t1-t2.

At t2, the DC-link capacitor has been charged up to the desired DC-voltage level (10% level) so that the desired output voltage Uo can be achieved solely on basis of the increase of the DC-link voltage. Consequently, the over-modulation mode 306 is stopped at time t2. If the modulation index Mi has not already been ramped down to the desired modulation value Mia, the modulating index Mi may be changed into the desired value Mia in the linear modulation range or possibly in the lower end of the over-modulation range. Thus, as an alternative to stopping the over-modulation mode, the modulation index Mi may be reduced to a lower value in the over-modulation range, e.g. a value which is acceptable for a given period of time with respect to generation of grid pollution due to generation of low-order harmonics.

The increased DC-link voltage reserve is maintained from t2-t3. At t3, a cease of the operational condition is detected. Consequently, the DC-link voltage is reduced back to the 5% DC-link voltage reserve. Due to the capacity of the DC-link capacitor, the discharging takes some time and, consequently, the output voltage Uo is reduced back to the nominal value over a corresponding period of time.

A faster reduction of the output voltage Uo can be achieved by applying a fast reduction of the modulation index Mi at t4, e.g. by applying a step-reduction (or fast reduction) of the modulation index to a value which is lower than the nominal value of the modulation index Mi0. This is illustrated by dotted line 310 for the jump in the modulation index and dotted line 311 for the output voltage Uo generated in response to the modulating index jump 310 and the DC-link voltage reduction during t3-t4.

The increase of the DC-link voltage during the DC-voltage adjustment mode is relatively low so that the increased DC-link voltage can be maintained for a longer period of time without causing a significant expected lifetime reduction of the switching elements of the power converter 203, 204 due to cosmic rays.

The concurrent application of increasing the modulation index into the over-modulation range and increasing the DC-link voltage allows a fast increase of the output voltage Uo so that operational conditions can be addressed effectively. According to the example in FIG. 3A, the over-modulation mode and the DC-voltage adjustment mode takes place concurrently during the common sub-period from t1 to t2.

However, the over-modulation mode and the DC-voltage adjustment mode need not be started at the same time, e.g. at t1 as shown in FIG. 3A. For example, the initiation of the DC-voltage adjustment mode could be delayed relative to the initiation of the over-modulation mode.

The change of the modulation index Mi from the over-modulation value to a normal or lower modulation index may be performed dependent on the DC-link voltage level obtained during the part of the DC-voltage adjustment mode where the DC-voltage is increased.

The modulation index Mi could be changed several times dependent on measures of the DC-link voltage, e.g. during the increase of the DC-link voltage to adapt the modulation index Mi to the gradual increase of the DC-link voltage. Thus, the modulation index may be adjusted one or more times during the over-modulation mode dependent on an obtained DC-link voltage between the first and second voltage levels 302, 303.

The desired output voltage Uo varies dependent on the amount of reactive current delivered or received by the grid side converter 204. That is, the voltage drop over the output inductors 206 varies dependent on the reactive current flowing through the inductors 206, so in order to generate a desired grid voltage Ug, the output voltage Uo may need to be varied so that the output voltage Ug at the grid side of the inductors 206 satisfies the grid voltage level.

Accordingly, in addition to changing the modulation index dependent on a level of the DC-link voltage UDC between the first and second voltage levels, the modulation index may be adjusted dependent on variations of the desired output voltage Uo.

Furthermore, the DC-link voltage UDC may be adjusted during the DC-voltage adjustment mode 305 dependent on variations of the desired output voltage Uo, possibly concurrent with adjustments of the modulation index during the over-modulation mode 306.

Although referred to as an over-modulation mode 306 where the modulation index is normally set to values in the over-modulation range, the modulation index may also be set to vales in the linear modulation range, at least for a part of the duration of the over-modulation mode 306.

The over-modulation mode 306 may be ended by adjustment of the modulation index Mi to a lower modulation index Mi, e.g. back to a modulation index in the linear range, dependent on the DC-link voltage between the first and second voltage levels. For example, when the DC-link voltage reaches the second voltage level 303, this may trigger a change of the modulation index, e.g. as illustrated in FIG. 3A.

The duration of the over-modulation mode 306 may be dependent on the detected operational condition, e.g. dependent on the rotation speed, the level of overvoltage of the grid voltage Ug or other value. For example, a particular detected condition may set a predetermined period of time of the over-modulation mode. Alternatively, a particular detected condition may set a minimum or maximum duration of the over-modulation mode so that the detected operational condition sets a variable period of time of the over-modulation mode with a possible minimum and/or maximum duration.

Since the level of the DC-link voltage UDC and the period of time that the DC-link has a certain voltage has an impact on the remaining lifetime of the grid side converter 204, information about the estimated remaining life time may be used for determining how the wind turbine 100 should be operated.

Figure 3B:
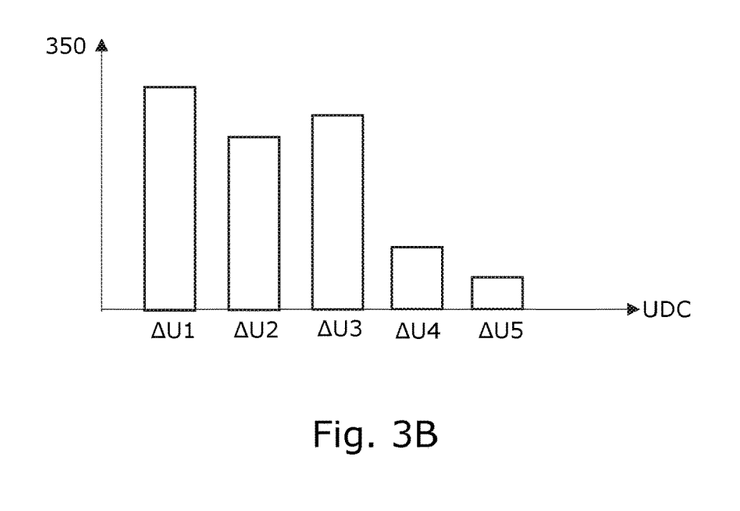
FIG. 3B shows accumulated DC-link voltage data obtained by summing the DC-link voltages over time.

The remaining life time may be determined based on accumulated DC-link voltage data which is obtained based on a DC-voltage and time data. For example, as illustrated in FIG. 3B, the accumulated DC-link voltage data 350 may be obtained summing or integrating the DC-link voltages over the period of time in which the DC-link voltage is within a given voltage range $\Delta 1$-$\Delta 5$. For example, a voltage range $\Delta 1$ may include DC-link voltages within a range from 5% to 10% above the nominal 0% level, or a range from 0% to 10% relative to the nominal voltage level of the DC-link voltage. The accumulated data binned into different ranges $\Delta 1$-$\Delta 5$ could be summed and used as a basis for determining the remaining lifetime with respect to cosmic rays. The accumulated DC-voltage data relates to an accumulated time where the DC-voltage is above a predetermined voltage level such as the 0% or 5% voltage level, or where the DC-voltage is within different ranges Δ1-Δ5.

For example, if the there is a limited remaining lifetime of the grid side converter 204, it may be advantageous to limit the value of the second voltage level 303 to a lover voltage reserve or to limit the maximum duration where an increased DC-voltage may be applied. In general, the remaining lifetime or the accumulated DC-voltage data can be used for determining voltage levels of the DC-link and/or maximum durations of a given DC-link voltage.

Figure 4:
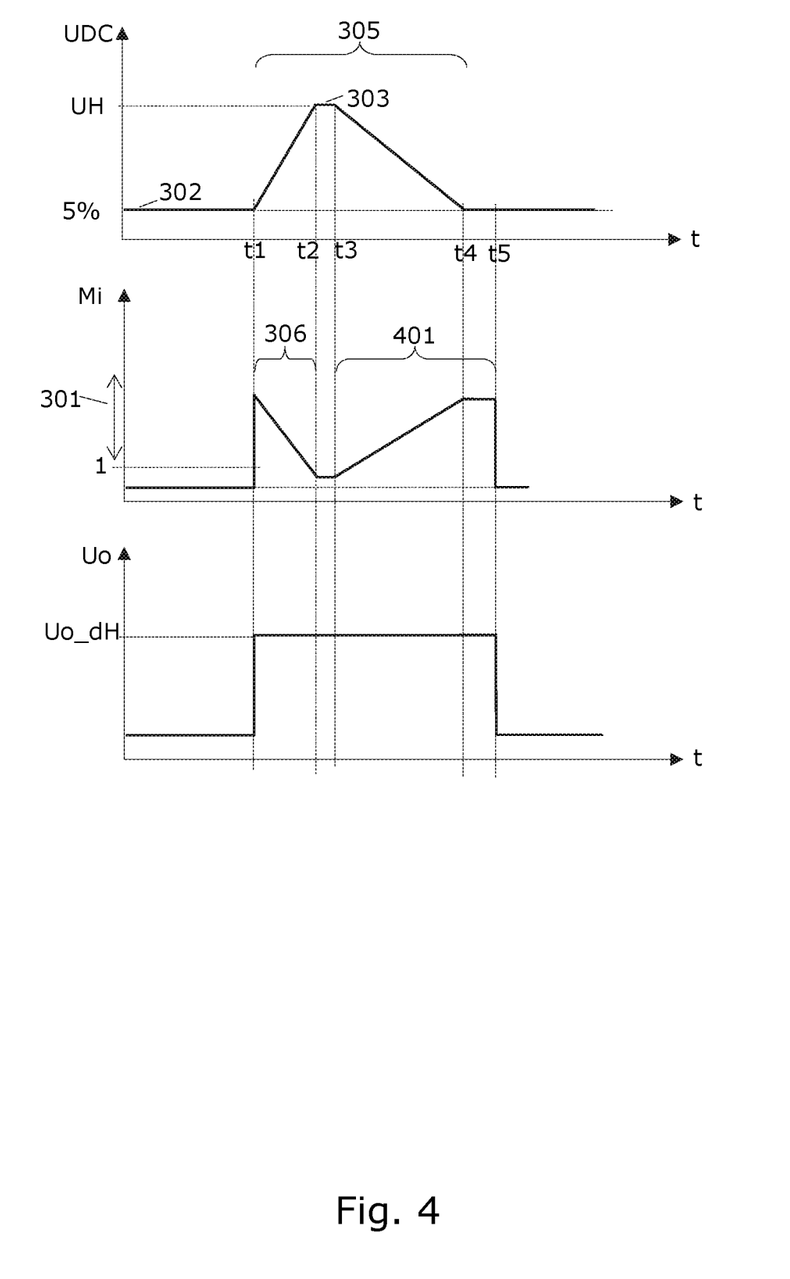
FIG. 4 shows another method for operating the wind turbine in response to a detected operational condition which requires a larger increase of the grid converter's output voltage.

FIG. 4 illustrates an example where the operational condition detected at t1 requires a larger increase of the output voltage Uo—here the output voltage Uo is intended to increase to the desired output voltage Uo_dH. The operational condition may be an overvoltage situation of the grid where the grid voltage may increase to e.g. 20% above the nominal grid voltage.

In order to generate the desired output voltage Uo_dH as soon the operational condition is detected at t1, the modulation index Mi is increased to a value in the over-modulation range. At the same time, or possibly delayed, the DC-link voltage is increased. At t2, the DC-link voltage reaches the high DC-link voltage UH which is required for generating the desired output voltage Uo_dH without overmodulation. The high DC-link voltage UH may be larger than the 10% voltage reserve in FIG. 3A. For example, UH may be 20-30% higher than the nominal DC-link voltage. Use of the high DC-link voltage for long periods will have a significant impact on accumulated DC-link voltage data 350 and remaining lifetime of the grid side converter 204.

Accordingly, use of the high DC-link voltage is preferably limited to a minimum. On the other hand, over-modulation is also problematic since it may generate undesired grid pollution.

A solution to the problem is illustrated in FIG. 4. After t2, when the DC-link voltage has reached the second voltage level 303 or other DC-voltage level above the first voltage level, the DC-link voltage UDC is decreased and the modulation index Mi is increased in the over-modulation range, possibly up to the six-step modulation.

The decrease of the DC-link voltage UDC and the increase of the modulation index may be initiated immediately after time t2 or delayed a short time to time t3. The decrease of the DC-link voltage UDC and the increase of the modulation index may start at the same time t2 or t3, or they may start at different times. Thus, the subsequent over-modulation mode 401 where the modulation index is increased takes place after the initial over-modulation mode 306 has been changed back to a linear modulation mode and the DC-voltage UDC has reached the second voltage level 303 or other high DC-voltage level.

Since the duration of the operational condition may not be known and since the required output voltage Uo may vary during the operational condition, the concurrent rate of change of the decreasing DC-link voltage UDC and the increasing modulation index Mi may be adjusted during the adjustment period from t3 to t4.

The duration of the initial over-modulation mode 306 may be significantly shorter than the subsequent over-modulation mode 401. For example, the initial over-modulation mode 306 may have a duration of 20 ms, whereas the subsequent over-modulation mode 401 may have a duration in the range from 0.1 seconds and up to 10 seconds or more. The wind turbine may be required to maintain a grid connection for much longer times, e.g. up to half an hour for over-voltage up to 116% or 125% of the nominal grid voltage. This can be achieved by use of the over-modulation mode 401 for the required period of time.

The concurrent decrease of the DC-link voltage UDC and increase of the modulation index Mi, i.e. the rate of changes of these, may be matched in order to achieve a desired output voltage of the grid side converter. For example, the rate of change of the increase of the modulation index Mi may be adapted dependent on the rate of change of the DC-link voltage UDC in order to generate a constant output voltage Uo.

It is noted that the decrease of the DC-link voltage UDC and the increase of the modulation index Mi may be shifted relative to each other, e.g. so that the initial decrease of the DC-link voltage is started before starting the increase of the modulation index Mi, i.e. before starting the over-modulation mode 401. Thus, in general at least a part of a period of decreasing the DC-link voltage and at least a part of a period of increasing the modulation index Mi takes place concurrently.

After the modulation index Mi has reached a value which generates the desired output voltage Uo, the modulation index may be maintained at a constant value or possibly adjusted according to changes of the grid voltage Ug or the desired output voltage Uo_d, Uo_dH.

The DC-link voltage UDC and the modulation index Mi may be changed linearly during the variation period (here from t3 to t4) or non-linearly including a step-wise variation.

Since the DC-link voltage is ramped down, the period where the DC-link voltage is high, e.g. above 10% of the nominal voltage, the negative lifetime effect on the grid side converter is reduced compared to solutions where the DC-link voltage is maintained at a high level. Similarly, since the modulation index is ramped up, use of high over-modulation for longer periods only occurs when the operational condition persists for relative long periods, i.e. periods which are longer than the ramping period of the DC-link voltage.

Figure 5:
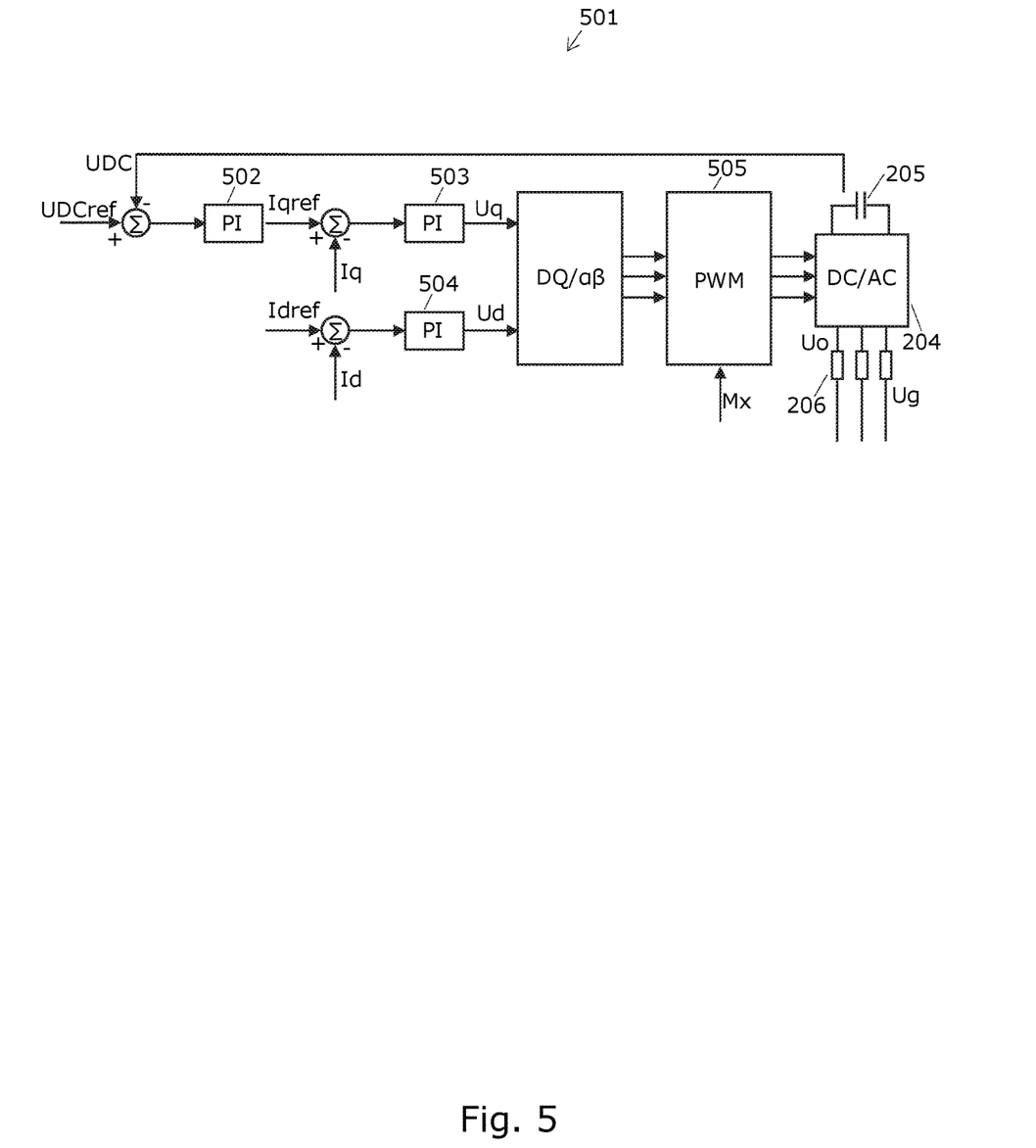
FIG. 5 shows a converter control system for controlling the reactive current Id and the active current Iq generated by the grid side converter.

FIG. 5 shows converter control system 501 for controlling the reactive current Id and the active current Iq generated by the grid side converter 204 and consequently the output voltage Uo. The converter control system 501, or components thereof, may form part of the control system 250. Alternatively, the converter control system 501 may receive control signals from the control system 250 such as a DC-link voltage reference UDCref and a modulation control signal Mx for the pulse width modulator 505.

The active current Iq is controlled via the voltage reference UDCref for the DC-link voltage UDC. The error between the UDCref and UDC is supplied to the controller 502 which may be PI or other suitable controller and which generates the active current reference Iqref. Iqref is compared with the actually produced active current Iq and the difference is supplied to the controller 503 which may be a PI or other suitable controller. The controller 503 determines a voltage control output Uq which is converted by the DQ/αβ unit from the DQ frame into the αβ frame. The output from the DQ/αβ unit is converted by the pulse-width-modulator PWM, 505 into a modulation signal for the grid side converter 204.

The reactive current Id is controlled is a similar way based on the reactive current reference Idref, which may be received from a power plant controller (PPC) or a grid operator (TSO).

The DC-link voltage reference UDCref is determined according to the desired DC-link voltages as explained above, e.g. the 5% level, the 10% level, the UH level, other levels and the up- and down rampings of the desired DC-link voltage.

Accordingly, an increased DC-link voltage reference UDCref leads to an increased Uq reference and thereby an increased output voltage Uo due to the increase of the DC-link voltage UDC.

The modulation index Mi of the modulator 505 can be controlled via the modulation input 506 by a modulation control signal Mx generated by the control system 250.

Alternative or supplementing embodiments relate to:

E1. A method for operating a wind turbine which comprises a power generator, a generator side converter, a grid side converter, a DC link electrically connected to an output of the generator side converter and an input of the grid side converter, the method comprises
  monitoring a wind turbine signal for detection of an operational condition which requires an increase of an output voltage of the grid side converter,
  upon detection of the operational condition, initiate an over-modulation mode wherein the grid side converter is operated with a modulation index being increased in an over-modulation range at least during a sub-period of the over-modulation mode,
  upon the detection of the operational condition, initiate a high DC-voltage mode wherein the a DC voltage of the DC link is decreased from a second voltage level towards a first voltage level at least during a sub-period of the over-modulation mode.

E2. A method wherein the sub-period of operating the grid side converter in the over-modulation mode is dependent on a duration of the detected operational condition.

E3. A method comprising determination of the second voltage level, the duration of the sub-period where the voltage of the DC link is decreased from the second voltage level towards the first voltage level and/or a rate of change of decreasing the voltage of the DC link, based on the accumulated DC-voltage data.

E4. A method wherein the detected operational condition is an over-voltage situation where grid voltage is above a nominal voltage level.

E5. A method wherein the sub-period where the modulation index is increased is a second period which succeeds a first sub-period of the over-modulation mode wherein the grid side converter is operated with a modulation index in an over-modulation range for a predetermined or variable period of time, and wherein the sub-period where the DC voltage of the DC-link is decreased is a second period which succeeds a first sub-period of the high DC-voltage mode wherein the a DC voltage of the DC link is increased from the first voltage level towards the second voltage level.

E6. A method wherein the first sub-period of the over-modulation mode and first sub-period of the high DC-voltage mode takes place concurrently.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for operating a wind turbine which comprises a power generator, a generator side converter, a grid side converter, a DC link electrically connected to an output of the generator side converter and an input of the grid side converter, the method comprises:
  monitoring a wind turbine signal for detection of an operational condition which requires an increase of an output voltage of the grid side converter;
  upon detection of the operational condition, initiate an over-modulation mode wherein the grid side converter is operated with a modulation index in an over-modulation range, wherein the modulation index is decreased at least during a sub-period of the over-modulation mode; and
  upon the detection of the operational condition, initiate a DC-voltage adjustment mode wherein a DC-voltage of the DC link is increased from a first voltage level towards a second voltage level, wherein the DC-voltage is increased at least during a sub-period of the DC-voltage adjustment mode.

2. The method of claim 1, wherein at least a sub-period of the over-modulation mode and a sub-period of the DC-voltage adjustment mode takes place concurrently.

3. The method of claim 2, where a rate of change of the decrease of the modulation index and a rate of change of the increase of the DC-voltage are matched in order to achieve a desired output voltage of the grid side converter.

4. The method of claim 1, comprising changing the modulation index dependent on a level of the DC-voltage between the first and second voltage levels.

5. The method of claim 1, comprising changing the over-modulation mode back to a linear modulation mode dependent on the DC-voltage between the first and second voltage levels.

6. The method of claim 1, where the first voltage level in a range from 3 to 10 percent above a minimum DC-voltage.

7. The method of claim 1, wherein the grid side converter is operated with a modulation index in an over-modulation range for a predetermined or variable period of time, where the predetermined or variable period of time is dependent on the detected operational condition.

8. The method of claim 1, comprising obtaining accumulated DC-voltage data based on the DC-voltage (UDC) and time data, where the accumulated DC-voltage data relates to an accumulated time where the DC-voltage is above a predetermined voltage level.

9. The method of claim 8, comprising determining the second voltage level and/or a maximum duration of applying the increased DC-voltage based on the accumulated DC-voltage data.

10. The method of claim 1, comprising, after the DC-voltage has reached the second voltage level, decreasing the DC-voltage and increasing the modulation index.

11. The method of claim 10, where increasing the modulation index takes place after the over-modulation mode has been changed back to a linear modulation mode and the DC-voltage has reached the second voltage level.

12. The method of claim 10, where a rate of change of the decrease of the DC-voltage and a rate of change of the increase of the modulation index are matched in order to achieve a desired output voltage of the grid side converter.

13. The method of claim 10, wherein at least a part of a period of decreasing the DC-voltage and at least a part of a period of increasing the modulation index takes place concurrently.

14. The method of claim 1, wherein the detected operational condition is one of an over-voltage situation where grid voltage is above a nominal voltage level, a recovery from an under-voltage situation where the grid voltages increases from a low voltage to the nominal voltage level, a generator condition where an increased output voltage of the grid side converter is required due a required increase of the generator speed, or a generator condition where over-modulation is temporarily required in situations where the modulation index is close to the over-modulation range.

15. A control system for operating a wind turbine, the wind turbine comprises a power generator, a generator side converter, a grid side converter, a DC link electrically connected to an output of the generator side converter and an input of the grid side converter, the control system is arranged to:
    monitor a wind turbine signal for detection of a certain operational condition which requires an increase of an output voltage of the grid side converter;
    upon detection of the operational condition, initiate an over-modulation mode wherein the grid side converter is operated with a modulation index in an over-modulation range, wherein the modulation index is decreased at least during a sub-period of the over-modulation mode; and
    upon the detection of the operational condition, initiate a DC-voltage adjustment mode wherein a DC-voltage of the DC link is increased from a first voltage level towards a second voltage level, wherein the DC-voltage is increased at least during a sub-period of the DC-voltage adjustment mode.

16. A wind turbine, comprising:
a tower;
a nacelle disposed on the tower;
a power generator disposed in the nacelle;
a generator side converter;
a grid side converter;
a DC link electrically connected to an output of the generator side converter and an input of the grid side converter,
a control system configured to perform an operation, comprising:
    monitor a wind turbine signal for detection of a certain operational condition which requires an increase of an output voltage of the grid side converter; and
    upon detection of the operational condition:
        initiate an over-modulation mode wherein the grid side converter is operated with a modulation index in an over-modulation range, wherein the modulation index is decreased at least during a sub-period of the over-modulation mode; and
        initiate a DC-voltage adjustment mode wherein a DC-voltage of the DC link is increased from a first voltage level towards a second voltage level, wherein the DC-voltage is increased at least during a sub-period of the DC-voltage adjustment mode.

17. The wind turbine of claim 16, wherein at least a sub-period of the over-modulation mode and a sub-period of the DC-voltage adjustment mode takes place concurrently.

* * * * *